(12) United States Patent
Abe et al.

(10) Patent No.: US 7,353,901 B2
(45) Date of Patent: Apr. 8, 2008

(54) SNOWMOBILE WITH IMPROVED COMPONENT LAYOUT

(75) Inventors: Tomohisa Abe, Saitama (JP); Kozo Yamada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 470 days.

(21) Appl. No.: 11/066,106

(22) Filed: Feb. 25, 2005

(65) Prior Publication Data
US 2005/0199432 A1 Sep. 15, 2005

(30) Foreign Application Priority Data
Mar. 11, 2004 (JP) .............................. 2004-069190

(51) Int. Cl.
*B62M 29/00* (2006.01)
(52) U.S. Cl. ........................ 180/190; 180/182; 180/309
(58) Field of Classification Search ................ 180/190, 180/182, 309
See application file for complete search history.

(56) References Cited

U.S. PATENT DOCUMENTS

| 3,525,412 | A | * | 8/1970 | Erickson | 280/25 |
|---|---|---|---|---|---|
| 3,931,862 | A | * | 1/1976 | Cote | 280/21.1 |
| 5,660,245 | A | * | 8/1997 | Marier et al. | 180/190 |
| 5,829,545 | A | * | 11/1998 | Yamamoto et al. | 180/190 |
| 5,957,230 | A | * | 9/1999 | Harano et al. | 180/68.4 |
| 5,996,717 | A | * | 12/1999 | Hisadomi | 180/182 |
| 6,941,924 | B2 | * | 9/2005 | Morii et al. | 123/198 R |

FOREIGN PATENT DOCUMENTS

| JP | 07228288 A | 8/1995 |
|---|---|---|
| JP | 2002364468 A | 12/2002 |

\* cited by examiner

*Primary Examiner*—Lesley D. Morris
*Assistant Examiner*—Michael Stabley
(74) *Attorney, Agent, or Firm*—Carrier, Blackman & Associates, P.C.; William D. Blackman; Joseph P. Carrier (57) ABSTRACT

An improved component layout in a snowmobile includes a muffler is disposed on the front side of an engine, and a lower portion of a steering shaft extends between the muffler and the engine. The engine is disposed rearwardly of the lower portion of the steering shaft. In other words, the steering shaft lower portion is disposed on the front side of the engine, whereby the engine is easily relocated rearwards with respect to the vehicle body so as to concentrate the center of mass at a central location of the vehicle body.

16 Claims, 12 Drawing Sheets

SNOWMOBILE WITH IMPROVED COMPONENT LAYOUT

CROSS-REFERENCE TO RELATED APPLICATIONS

The present invention claims priority under 35 USC 119 based on Japanese patent application No. 2004-069190, filed on Mar. 11, 2004. The subject matter of this priority documents is incorporated by reference herein.

BACKGROUND OF THE INVENTION

1. Field of the Invention

The present invention relates to a snowmobile used for traveling on a snow field and having an engine as a drive source.

2. Description of the Background Art

Snowmobiles have been used for many years, and the basic operation thereof is well known. However, a variety of proposals have been made as to an improved layout of components, such as the arrangement of an air cleaner and a muffler around the engine. Examples of such proposals are provided in Japanese Patent Laid-open No. 2002-364468, and in Japanese Patent Laid-open No. Hei 7-228288.

In general terms, it is desirable to provide an arrangement of components in which the center of gravity of the snowmobile is in the center of the vehicle body, and is generally low with respect to overall vehicle height. A snowmobile is disclosed in Japanese Patent Laid-open No. 2002-364468 (see especially FIG. 3 thereof), the snowmobile having an engine, a steering post, and a steering handle bar. In this disclosure, the engine is disposed on the front side of the steering post 26. However, in order to relocate the engine, which is a heavy component, to a more rearward position within the vehicle in consideration of the need to regulate the position of the center of gravity, the presence of the steering post hampers the engine from being displaced rearwards. Therefore, the layout disclosed in Japanese Patent Laid-open No. 2002-364468 is inconvenient because it is difficult to regulate the position of the center of gravity of the vehicle.

An alternative snowmobile component layout is described in Japanese Patent Laid-open No. Hei 7-228288. In this layout, a generator, a recoil starter and a muffler are disposed on a lateral side (the right side) of the engine (see especially paragraph No. 19 thereof).

In recent years, for the purposes of reducing undesired emissions and enhancing the silencing performance and the like, the muffler has been increased in size and weight. When the muffler 21 of Japanese Patent Laid-open No. Hei 7-228288 is increased in size and weight, it becomes difficult to maintain the left-right weight balance, which may adversely affect the turning performance of the snowmobile.

SUMMARY OF THE INVENTION

It is an object of the present invention to provide a snowmobile in which an engine can be relocated towards the rear of the vehicle, and which provides excellent turning performance.

According to a first aspect of the invention, a snowmobile is provided which comprises a left-right pair of skis, an engine, and a track belt all disposed on a vehicle body in this order from the front side toward the rear side of the snowmobile. The track belt is driven by the power of the engine to thereby cause the snowmobile to travel, and the skis are steered by operation of a steering handle. The snowmobile further comprises a muffler, provided in an exhaust system of the engine and disposed forwardly of the engine. In addition, a steering shaft, which transmits a steering force from the steering handle to the skis, extends between the muffler and the engine.

According to a second aspect of the invention, the engine includes a plurality of cylinders, and the exhaust system further includes an exhaust pipe manifold portion for bringing together a plurality of exhaust pipes. The steering shaft passes between adjacent exhaust pipes at a location adjacent to, or upstream from, the manifold portion.

According to a third aspect of the invention, the steering shaft includes a universal joint interposed in the course of the steering shaft, and a lower portion of the steering shaft is disposed close to the engine.

According to a fourth aspect of the invention, an angle of inclination of an upper portion of the steering shaft is adjustable.

According to a fifth aspect of the invention, a snowmobile is provided which comprises a left-right pair of skis, an engine, and a track belt all disposed on a vehicle body in this order from the front side toward the rear side of the snowmobile. The track belt is driven by the power of the engine to thereby cause the snowmobile to travel, and the skis are steered by operation of a steering handle. The snowmobile further comprises a muffler, provided in an exhaust system of the engine, and disposed forwardly of the engine between left and right front suspensions for suspending the left and right skis. A connection portion of the muffler, for connection with each of exhaust pipes, is provided on the front side or the rear side of the muffler.

According to a sixth aspect of the invention, the exhaust pipes and an exhaust pipe manifold portion extend on the upper side of the muffler. In addition, a downstream-side exhaust pipe on the downstream side of the exhaust pipe manifold portion is bent back in a U shape and is connected to a front portion of the muffler.

According to a seventh aspect of the invention, a snowmobile is provided which comprises a left-right pair of skis, an engine, and a track belt all disposed on a vehicle body in this order from the front side toward the rear side of the snowmobile. The track belt is driven by the power of the engine to thereby cause the snowmobile to travel, and the skis are steered by operation of a steering handle. The snowmobile further comprises a muffler, provided in an exhaust system of the engine, and disposed forwardly of the engine between left and right front suspensions for suspending the left and right skis. A connection portion of the muffler, for connection with each of exhaust pipes, is provided on a lateral side of the muffler.

According to an eighth aspect of the invention, the muffler is generally flat so as to be small in height and broad in the width direction.

According to the first aspect of the invention, the muffler is disposed on the front side of the engine. As a result, the muffler can be disposed at, or in the vicinity of, the center of the vehicle width. In this arrangement, the left-right weight balance of the snowmobile is easily equalized, and turning performance of the snowmobile is enhanced. In addition, since the engine is disposed on the rear side of the steering shaft, the engine can be easily displaced rearwards.

It is possible to provide both a structure in which the steering shaft extends on the front side of the muffler, and a structure in which the steering shaft extends between the muffler and the engine. If the steering shaft is arranged so as to extend on the front side of the muffler, a longer steering shaft is required. On the other hand, if the steering shaft extends between the muffler and the engine, the steering shaft can be made shorter in length. Therefore, according to the first aspect of the invention, a shortening of the steering shaft is easily achieved.

According to the second aspect of the invention, the steering shaft extends between the exhaust pipes at a location forwardly of a connection of the exhaust pipes with the manifold, and at a location in which the exhaust pipes are adjacent to each other. As a result, the dead space inevitably generated between the adjacent exhaust pipes is changed to a useful space.

According to the third aspect of the invention, a universal joint is interposed in the course of the steering shaft. Further, the lower portion of the steering shaft is disposed close to the engine. Because the steering shaft lower portion is disposed close to the engine, the muffler can also be disposed close to the engine in conjunction therewith. As a result, concentration of mass in the vehicle body longitudinal (front-rear) direction is achieved.

According to the fourth aspect of the invention, the angle of inclination of an upper portion of the steering shaft is adjustable, so that the height and angle of the steering handle can be changed in conformity with the rider's physique or preference. This feature provides an enhanced convenience in use of the snowmobile.

According to the fifth aspect of the invention, the muffler is disposed between the left and right front suspensions. In this way, the heavy muffler body is disposed close to the longitudinal centerline of the vehicle body. As a result, the turning performance is further enhanced, a slim vehicle body is adopted, and the vehicle body is reduced in size.

In addition, since the connection portion between the muffler and each of exhaust pipes is provided on the front side or the rear side of the muffler, the longitudinal axis of the muffler is set parallel to the longitudinal axis of the vehicle body, the vehicle width is reduced without being affected by the width of the muffler, and slimming of the vehicle body is promoted.

According to the sixth aspect of the invention, the exhaust pipes and an exhaust pipe manifold portion pass on the upper side of the muffler. In other words, the muffler is disposed below the exhaust pipes. In recent years, mufflers are comparatively large in size and heavy. Since the muffler, being a heavy body, is laid out at a low position, lowering of the center of gravity of the vehicle body is promoted.

According to the seventh aspect of the invention, the muffler is disposed between the left and right front suspensions. Thus, the heavy muffler body is disposed close to the center of the vehicle body. As a result, the turning performance of the snowmobile is enhanced, a slim vehicle body is adopted, and the vehicle body is reduced in size.

It can be noted that when the connection portion between the muffler and each of exhaust pipes is provided on the front side of the muffler, the exhaust pipes must pass on the upper or lower side of the muffler, leading to the tendency that a front portion of the vehicle body is large in height. From this point of view, according to the seventh aspect of the invention, the connection portion between the muffler and each of the exhaust pipes is provided on a lateral side of the muffler. As a result, the exhaust pipes are absent from the upper side of the muffler or the like, and the height of the front portion of the vehicle body is made small.

According to the eighth aspect of the invention, a muffler is provided having a generally flat shape so as to be small in height and broad sideways. With a relatively short muffler, it is possible to lower the center of gravity of the muffler, and to further lower the center of gravity of the vehicle body.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION OF THE INVENTION

The best mode for carrying out the present invention will be described below, based on the accompanying drawings. In the drawings and the figures, L is a subscript indicating the left as viewed from the driver, and R is a subscript indicating the right as viewed from the driver.

Figure 1:
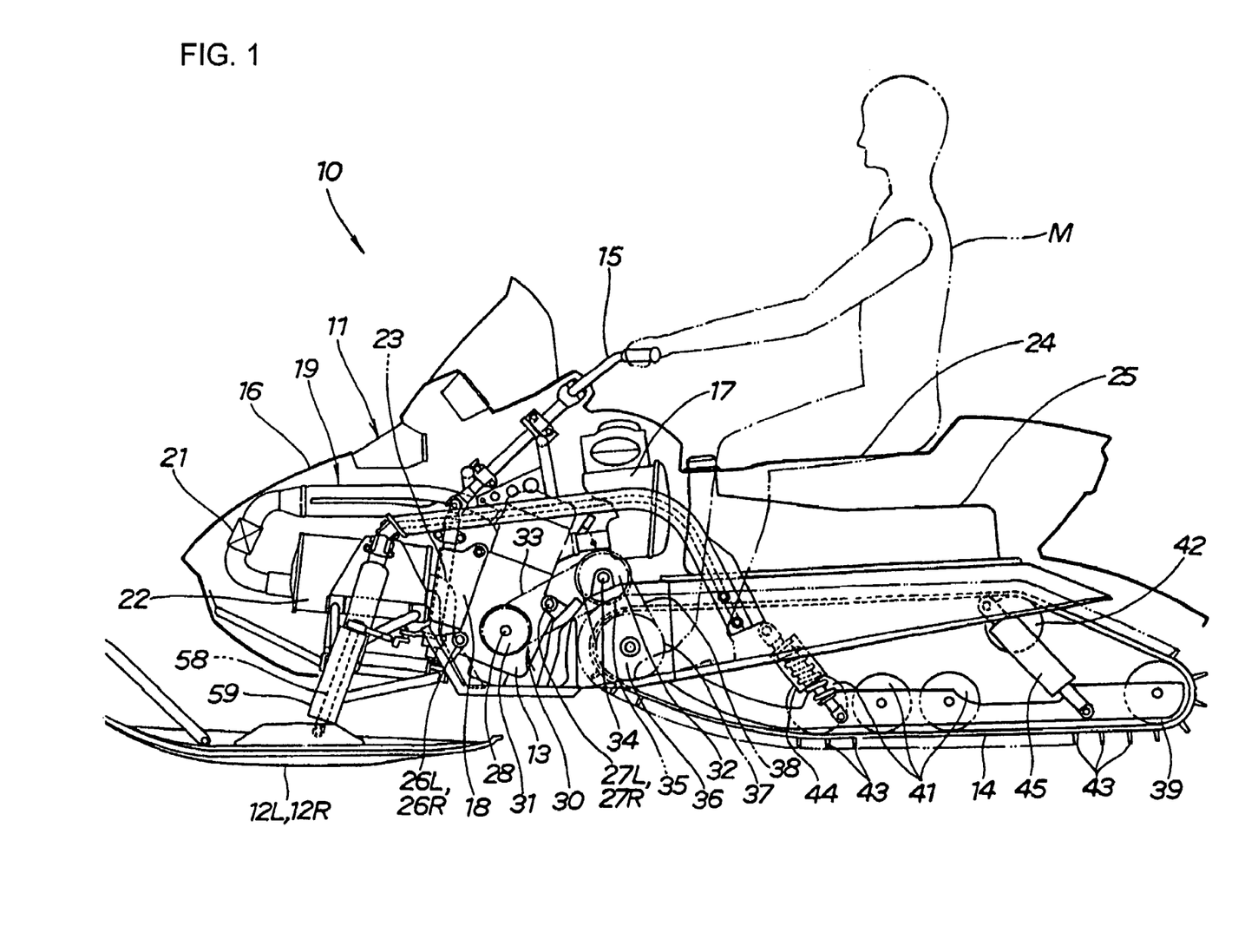
FIG. 1 is an overall side view of a snowmobile according to the present invention showing the shape and location of the muffler with respect to the engine and steering shaft.

FIG. 1 is an overall side view of a snowmobile according to the present invention. The snowmobile 10 is a snow vehicle which comprises a left-right pair of skis 12L, 12R (12R is behind 12L, here and hereinafter), an engine 13 and a track belt 14 in this order from the front side toward the rear side of a vehicle body 11. The snowmobile 10 can travel by driving the track belt 14 by the power of the engine 13. The skis 12L, 12R are steered by operating a steering handle 15. The configuration of a steering system will be described in detail referring to another figure.

As seen in FIG. 1, a rider M is shown in a seated position on a seat 24 of the snowmobile 10. Also shown are a vehicle body cover 16, an air cleaner 17, an oil tank 18, an exhaust pipe 19, a catalytic converter 21, a muffler 22, a tail pipe 23, and a fuel tank 25.

First, an intake and exhaust system will be described. Air taken in through the air cleaner 17 is fed into a combustion chamber of the engine 13. An exhaust gas generated upon combustion is discharged into the atmosphere through the exhaust pipe 19, the catalytic converter 21, the muffler 22, and the tail pipe 23. The tail pipe 23 extends rearward from the muffler 22, then bends so as to extend transverse to the longitudinal direction of the snowmobile, and then bends again to extend downward, whereby the exhaust gas is blown toward the snow surface.

Next, a drive system will be described. The engine 13 is mounted on a vehicle body frame through engine hangers 26L, 26R, 27L, 27R (details of the layout of them will be described later), and a drive pulley 31 is mounted to a crankshaft 28 of the engine 13.

A continuously variable transmission (CVT) belt 33 is wrapped around both the drive pulley 31 and a driven pulley 32 disposed under the air cleaner 17, whereby a belt-type non-stage transmission 30 is constituted. A cross shaft 34 supports the driven pulley 32 and extends in the transverse direction of the vehicle. A first sprocket 35 is attached to the tip end of the cross shaft 34, and a chain 38 is wrapped around both the first sprocket 35 and a second sprocket 37 annexed to a drive wheel 36.

The power of the engine 13 is transmitted sequentially through the drive pulley 31, the CVT belt 33, the driven pulley 32, the cross shaft 34, the sprocket 35, the chain 38, and the sprocket 37, whereby the drive wheel 36 can be rotated to drive the snowmobile 10 in the forward and reverse directions.

A drive wheel 36 is disposed at a front portion of the track belt 14, a driven wheel is disposed at a rear portion of the track belt 14, and a plurality of rotary wheels are disposed at an intermediate lower portion of the track belt 14. An idler 42 is disposed at an upper portion of the track belt 14. The track belt 14 is wrapped around the drive wheel 36, the driven wheel 39, the plurality of rotary wheels 41 disposed at an intermediate lower portion, and the idler 42. Projections 43 are provided on the outside surface of the track belt 14, and are driven into the snow surface, to provide traction for traveling. Vertical movements, generated at the time of riding over rugged snow surfaces and the like, are absorbed by rear shock absorbers 44, 45.

Figure 2:
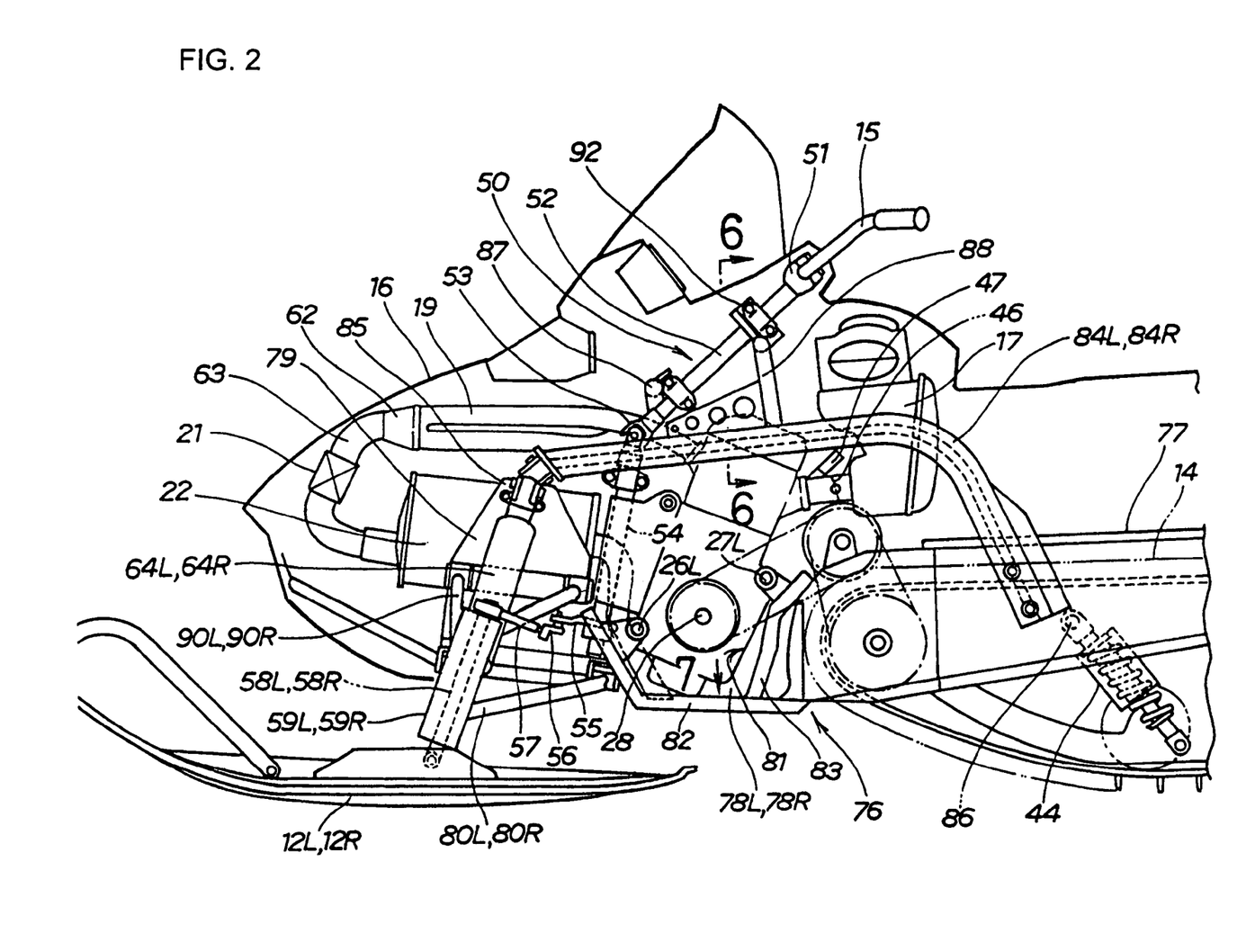
FIG. 2 is a partial side view of a front portion of the snowmobile according to the present invention showing the frame structures surrounding the engine.

FIG. 2 is a side view of a front portion of the snowmobile according to the present invention, in which the steering handle 15 and the skis 12L, 12R are connected by use of a steering shaft 50 (described below) and links. Also shown in FIG. 2 is an air cleaner 17, a throttle valve 46 provided on the downstream side of the air cleaner 17, and an injector 47 provided on the downstream side relative to the throttle valve 46.

The steering shaft 50 is composed of a steering shaft upper portion 52, a steering shaft lower portion 54, and a universal joint 53. The steering shaft upper portion 52 is provided with a steering handle holder 51 at the top end thereof, and is inclined forwardly downwards. The universal joint 53 is attached to the lower end of the steering shaft upper portion 52, and the steering shaft lower portion 54 extends substantially vertically downwards from the universal joint 53.

A lever 55 is provided at the lower end of the steering shaft lower portion 54. A drive member 56 extends in the vehicle width direction (transverse to the longitudinal direction) and is connected to the lever 55. Levers 57 are attached respectively to the left and right ends of the drive member 56, and vertically directed spindles 58L, 58R are rotated about roughly vertical axes by the levers 57, whereby the skis 12L, 12R can be steered.

The spindles 58L, 58R are rotatably contained in front leg portions 59L, 59R, and are vertically movably supported by lower arms 80L, 80R, upper arms 90L, 90R and front suspensions 64L, 64R which are vertically movably mounted to the vehicle body frame.

In addition, a characteristic feature lies in that the muffler 22 is disposed on the front side (the left side as seen in the figure) or forwardly of the engine 13, and the steering shaft lower portion 54 of the steering shaft 50 passes between the muffler 22 and the engine 13. The engine 13 is disposed on the rear side or rearwardly of the steering shaft lower portion 54. Namely, the steering shaft lower portion 54 is disposed on the front side of the engine 13, so that the engine 13 can be easily relocated rearwards.

It is possible to provide both a structure in which the steering shaft 50 is passed on the front side of the muffler 22, and a structure in which the steering shaft 50 is passed between the muffler 22 and the engine 13. If the steering shaft is arranged so as to pass on the front side of the muffler 22, a longer steering shaft 50 is required. On the other hand, if the steering shaft 50 passes between the muffler 22 and the engine 13, the steering shaft 50 can be made shorter in length. Therefore, on this basis, in the present invention the steering shaft lower portion 54 is arranged to pass between the muffler 22 and the engine 13 so that a shortening of the steering shaft 50 is easily achieved.

In addition, another characteristic feature of the invention resides in that the universal joint 53 is interposed at an intermediate portion of the steering shaft 50, and the steering shaft lower portion 54 is set close to the engine 13. When the steering shaft lower portion 54 can be set close to the engine 13, the muffler 22 can also be set close to the engine 13 in conjunction with this. As a result, mass is concentrated in the vehicle body longitudinal direction.

The vehicle body frame 76 comprises intermediate frames 78L, 78R, a rear frame 77, and a front frame 79. The intermediate frames 78L, 78R are formed in U shape in side view, and are connected to front portions of the rear frame 77. The rear frame 77 has a roughly U shaped section opened to the lower side so as to be situated astride the top surface and the left and right side surfaces of the track belt 14. The front frame 79 is connected to front portions of the intermediate frames 78L, 78R. The vehicle body frame is characterized in that a reinforcement as described below is applied to the intermediate frames 78L, 78R.

The intermediate frames 78L, 78R are made to be U-shaped in side view, and each are provided with a cutout portion 81 for permitting the crankshaft 28 or the like to be passed therethrough. Since the intermediate frames 78L, 78R are U-shaped frames, it is desirable to apply appropriate reinforcement to the frames. In view of this, an L-shaped reinforcement member 82 and an I-shaped reinforcement member 83 are annexed to each of the intermediate frames 78L, 78R along the cutout portion 81, to thereby reinforce the cutout portion 81.

Further, an upper portion of the front frame 79 and a front upper portion of the rear frame 77 are connected by side frames 84L, 84R so as to cross the cutout portion 81. Specifically, the front suspensions 64L, 64R are mounted to the front frame 79, and the tip ends of the side frames 84L, 84R are connected in the vicinity of a suspension receiving portion 85, provided for mounting the front suspensions 64L, 64R to the vehicle body frame. The rear shock absorber 44 is mounted to the rear frame 77, and the rear ends of the side frames 84L, 84R are connected to rear frame 77 in the vicinity of a shock absorber receiving portion 86, provided for mounting the shock absorber 44 to the rear frame 77. By this configuration, the front frame 79 and the rear frame 77 are firmly connected to each other.

Returning to FIG. 1, the engine 13 is disposed so as to be inclined toward the rear of the vehicle. Specifically, the engine head portion 13a and the cylinder 13b are inclined rearward relative to the vertical axis by an angle θ. Thus, the center of gravity of the engine is lowered, and the center of gravity of the snowmobile is set to be close to the center of the vehicle body. Since the center of gravity is set to be close to the center of the vehicle body, it is possible to keep the vehicle body stable, particularly during high-speed operation and operation on a largely rugged snow surface. As a result, a more pleasant operating experience is achieved.

Figure 3:
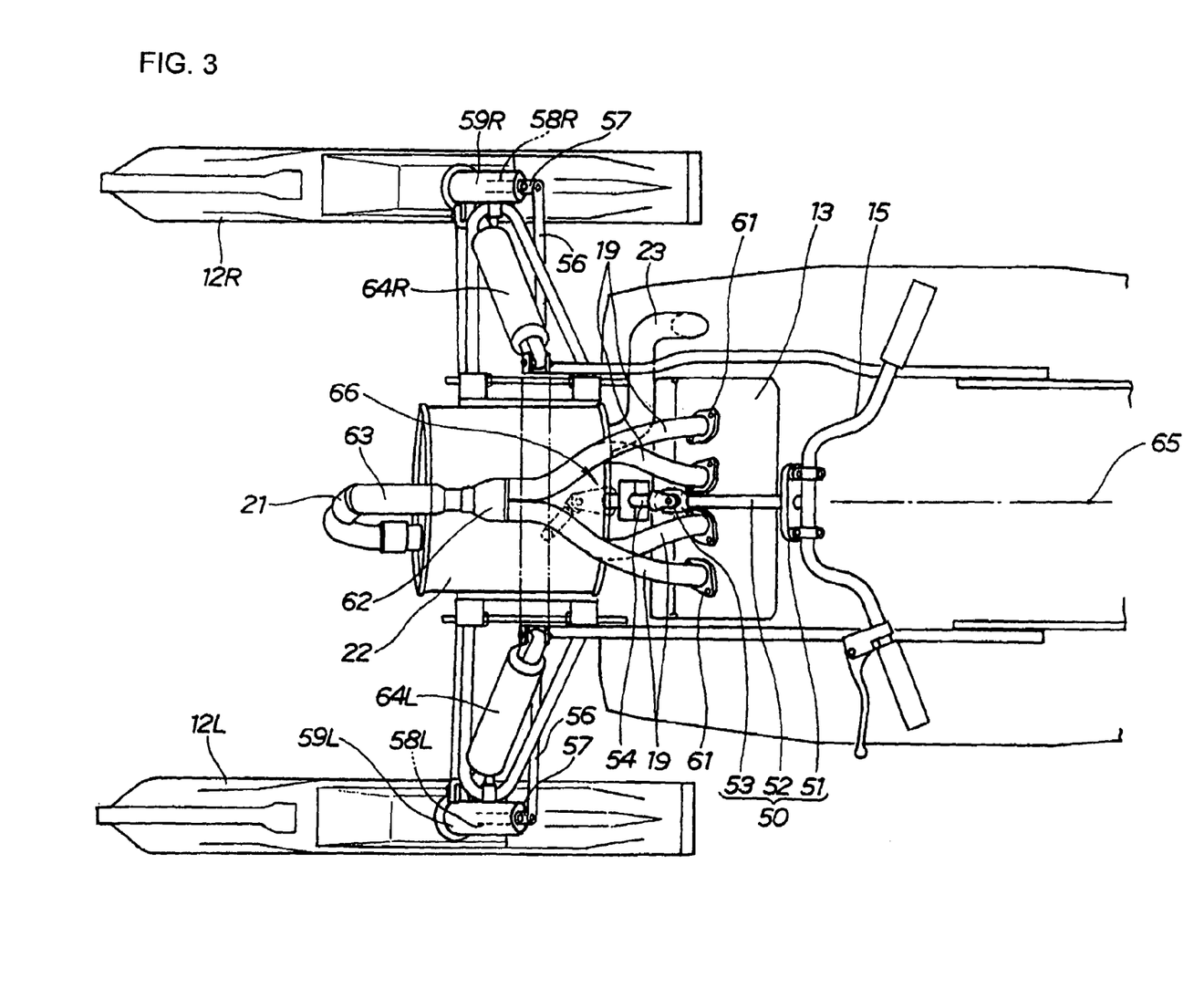
FIG. 3 is a plan view of the front portion of the snowmobile according to the present invention with the vehicle body cover omitted, showing alignment of the muffler and other exhaust system components with the vehicle longitudinal center line.

FIG. 3 is a plan view of a front portion of the snowmobile according to the present invention, illustrated with the vehicle body cover omitted. The engine 13, shown in this embodiment as a series 4-cylinder engine, is disposed so that the crankshaft extends in the vehicle width direction and that the plural exhaust ports 61 are directed toward the front side.

The plural exhaust pipes 19 extend respectively from the exhaust ports 61, and are united into a single pipe at an exhaust pipe manifold portion 62. A single manifolded exhaust pipe 63 extends forward from an outlet of the exhaust pipe manifold portion 62, is then bent back in a U shape, and is connected to a front portion of the muffler 22. The left and right front suspensions 64L, 64R are disposed respectively on the left side and the right side of the muffler 22.

As is clear from the figure, the muffler 22 is disposed so that the longitudinal axis of the muffler 22 is parallel to the longitudinal axis 65 of the vehicle body (an axis aligned with the vehicle centerline extending from front to rear of the vehicle). Thus, the length of the muffler 22 does affect the overall vehicle body width. The muffler 22 is disposed between the left and right front suspensions 64L, 64R, which allows adoption of a slim vehicle body and a reduction in the vehicle body size.

In addition, since the muffler 22 is disposed on the front side of the engine 13, the muffler 22 can be laid out on the longitudinal axis 65 or in the vicinity of the longitudinal axis 65. As a result, the vehicle is easily balanced in the left-right direction, and steering performance is enhanced.

Furthermore, the steering shaft 50 passes between adjacent exhaust pipes 19, 19. As a result, a dead space 66, which is customarily generated between the adjacent exhaust pipes 19, 19, is now used as an effective space.

Figure 4:
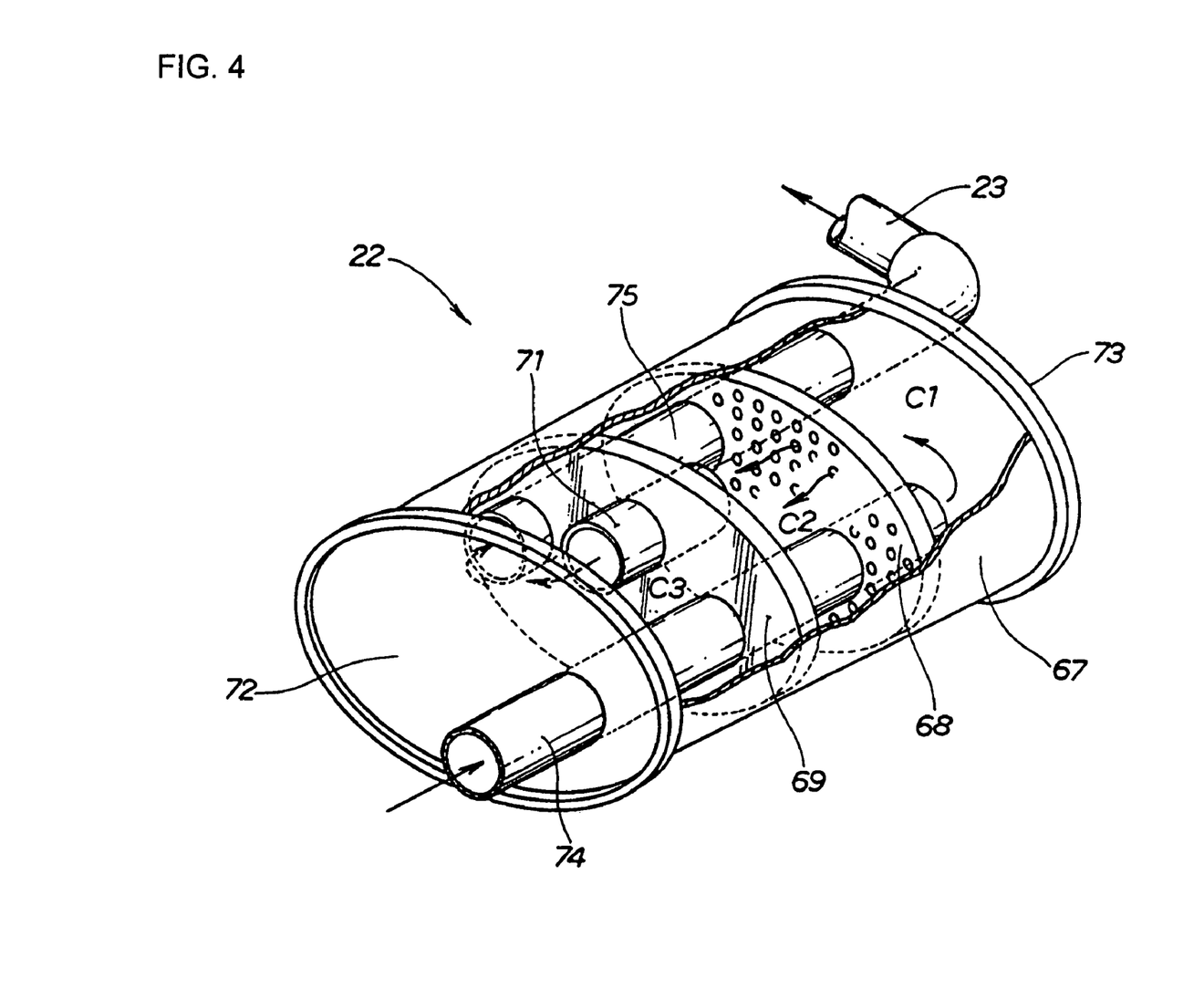
FIG. 4 is a perspective view of a muffler adopted in the present invention, with a muffler housing partly broken away to revel inner structure.

FIG. 4 is a perspective view of the muffler adopted in the present invention. The muffler 22 is a silencing box having a structure in which a porous plate 68 and a partition wall 69 are interposed in the inside of an elliptic tube 67 having an elongate section. The front and rear openings of the elliptic tube 67 are closed with front and rear lids 72, 73. The partition wall 69 is provided with a pass through pipe 71. An exhaust gas inlet pipe 74 is provided so as to extend through the front lid 72, the partition wall 69 and the porous plate 68.

An exhaust gas outlet pipe 75 is provided so as to pass through the partition wall 69, the porous plate 68 and the rear lid 73.

An exhaust gas flows through the exhaust gas inlet pipe 74 into a first chamber C1, flows from the first chamber C1 through the porous plate 68 into a second chamber C2, flows from the second chamber C2 through the passing pipe 71 into a third chamber C3, and flows from the third chamber C3 through the exhaust gas outlet pipe 75 into the tail pipe 23.

The muffler 22 is formed to be short in height and broad sideways. This form makes it possible lower the center of gravity of the muffler 22. By laying out the muffler 22 of the low center-of-gravity type as shown in FIG. 2 and in FIG. 5, described later, it is possible to further lower the center of gravity of the vehicle body.

Figure 5:
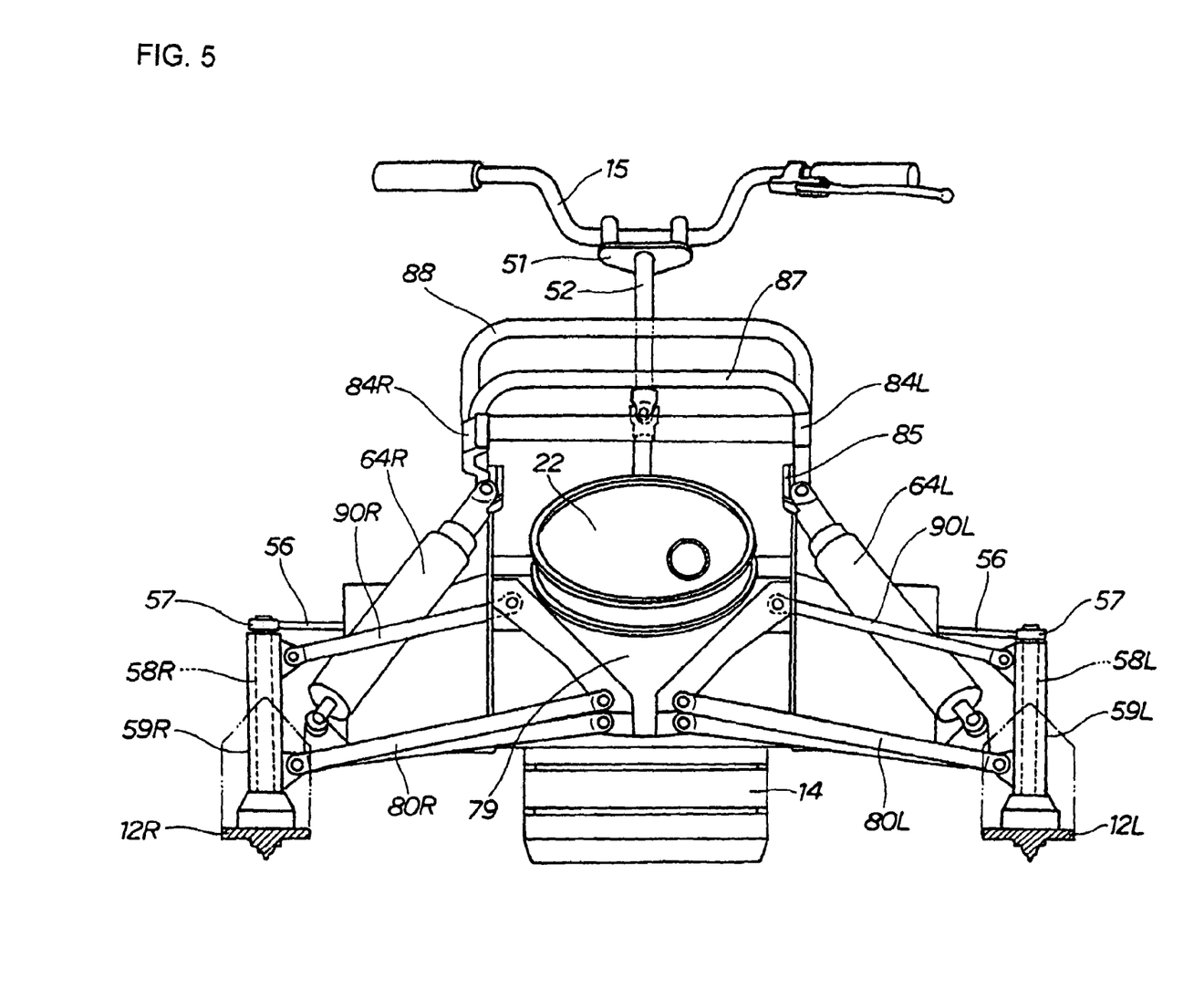
FIG. 5 is a front view of the snowmobile according to the present invention with the vehicle body cover omitted, showing the connection of the enhanced frame structure to the snowmobile suspension.

FIG. 5 is a front view of the snowmobile according to the present invention in which the vehicle body cover is omitted. The lower arms 80L, 80R extend to the left and right sides from the front frame 79, upper arms 90L, 90R are extended to the left and right sides from the front frame 79, and the front leg portions 59L, 59R are connected to the tip ends of the arms 80L, 80R, 90L, 90R. In addition, the lower ends of the front suspensions 64L, 64R are connected to the tip ends of the lower arms 80L, 80R, whereby a suspension mechanism for the skis 12L, 12R is constituted.

The left and right J-shaped frames 84L, 84R are present behind (as viewed in this figure) portions for supporting the left and right front suspensions 64L, 64R, and front and rear two cross pipes 87, 88 are bridgingly disposed between the J-shaped frames 84L, 84R, to form a structure for enhancing the rigidity in the vehicle body sectional direction.

Figure 6:
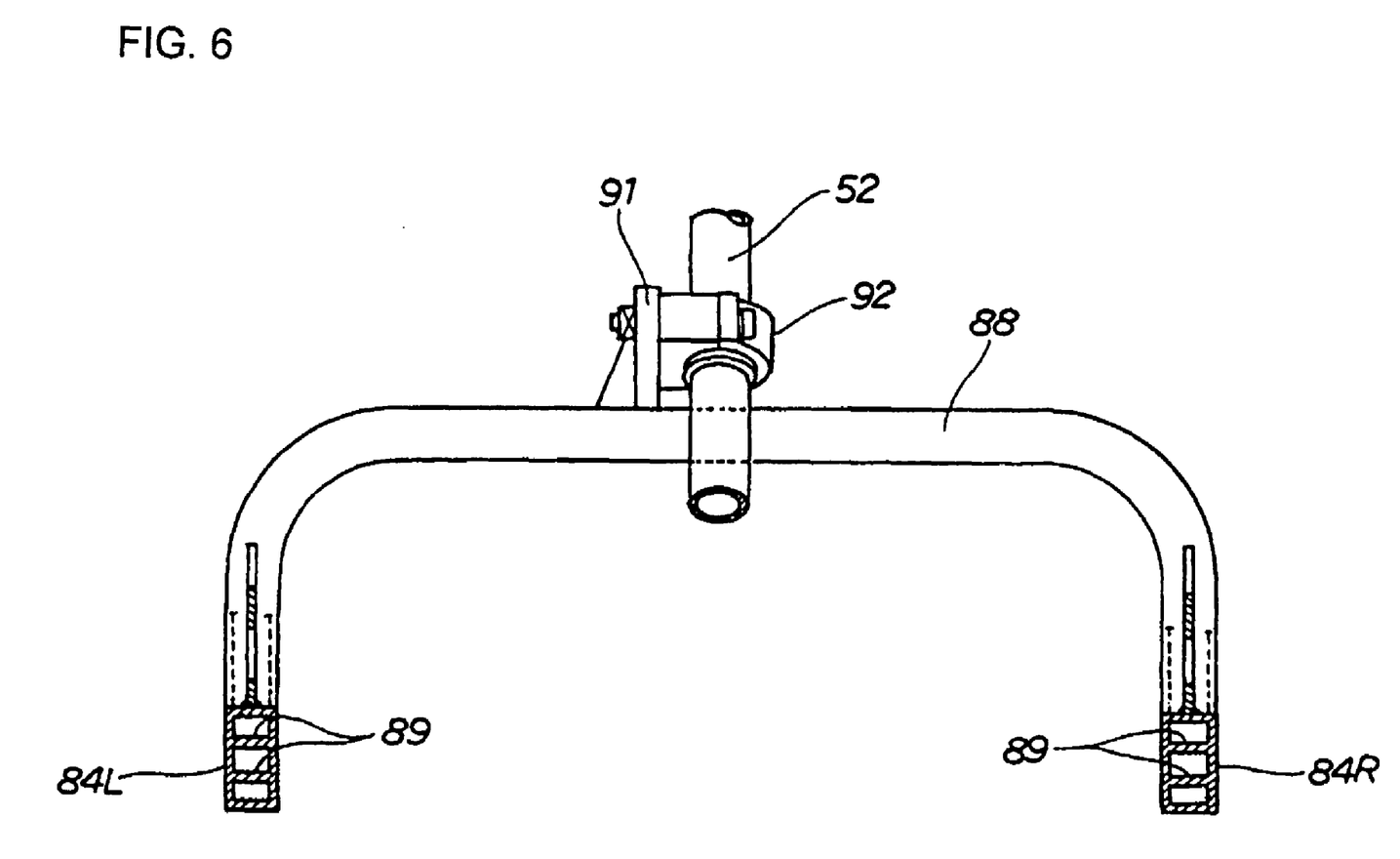
FIG. 6 is a sectional view along line 6-6 of FIG. 2 showing the crossbar which joins the opposed side frames, and showing the steering bar mounted to the cross bar.

FIG. 6 is a sectional view along line 6-6 of FIG. 2, in which the left and right J-shaped frames 84L, 84R coupled by the cross pipe 88 are composed of extruded members being substantially rectangular-shaped in section. Two ribs 89, 89 are bridgingly provided in the inside of the extruded member, in addition to the substantially rectangular-shaped section, whereby it is possible to drastically enhance the flexural rigidity and deflectional rigidity. Since extrusion permits free selection of the sectional shape, a substantially rectangular-shaped section with a single bridging rib and a substantially rectangular-shaped section with more than two bridging ribs can be obtained by decreasing or increasing the number of the ribs 89.

In addition, the cross pipe 88 is provided with a bracket 91, a bearing block 92 is attached to the bracket 91, and the steering shaft upper portion 52 is rotatably supported on the bearing block 92. Although the cross pipe 88 is provided for the purpose of holding the left and right side frames 84L, 84R from moving in the transverse direction, the cross pipe also movably supports the steering shaft upper portion 52. Thus the cross pipe 88 provides dual functions in the structure of the snowmobile.

Figure 7:
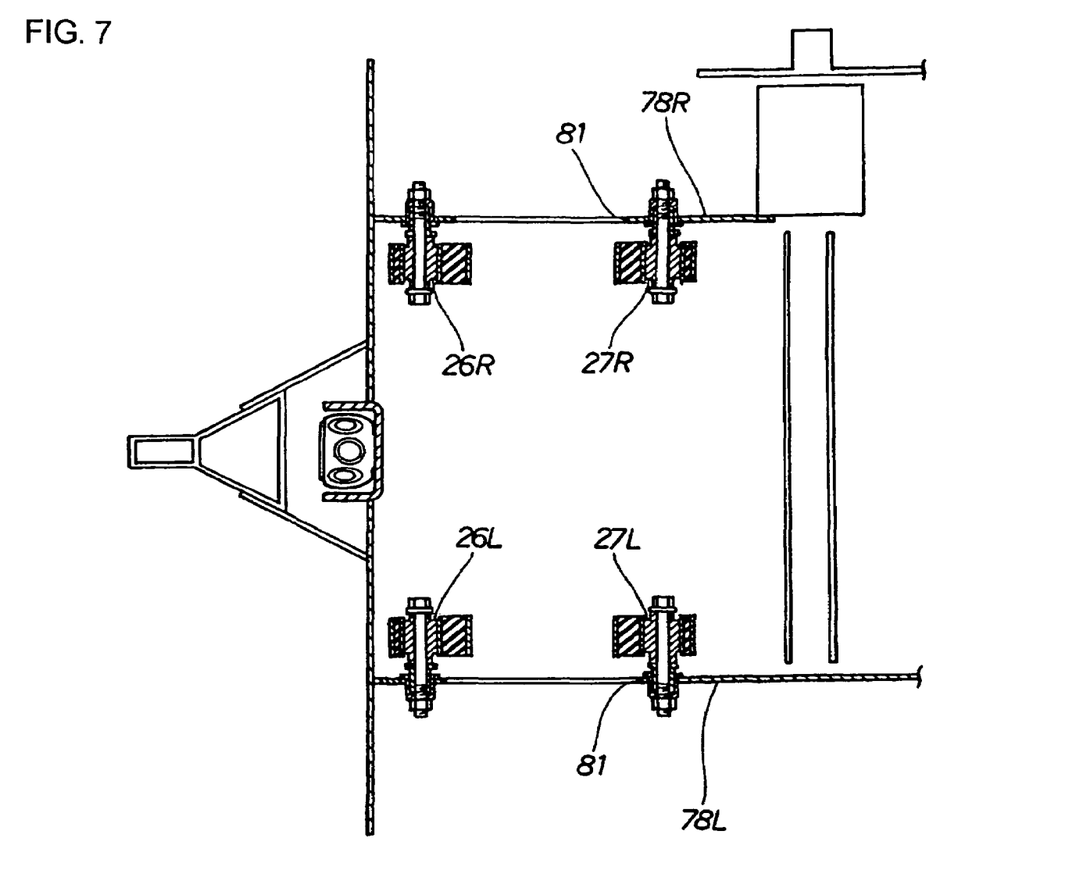
FIG. 7 is a view along arrow 7 of FIG. 2 showing the engine mounting hangers arranged on the front and rear, left and right sides of the frame.

FIG. 7 is a view along arrow 7 of FIG. 2, showing that the left intermediate frame 78L is provided with the engine hangers 26L, 27L. In addition, the right intermediate frame 78R is provided with the engine hangers 26R, 27R. The engine 13 is supported on the vehicle body frame 76 through the four engine hangers 26L, 26R, 27L, 27R arranged on the front and rear sides and the left and right sides thereof.

Figure 8:
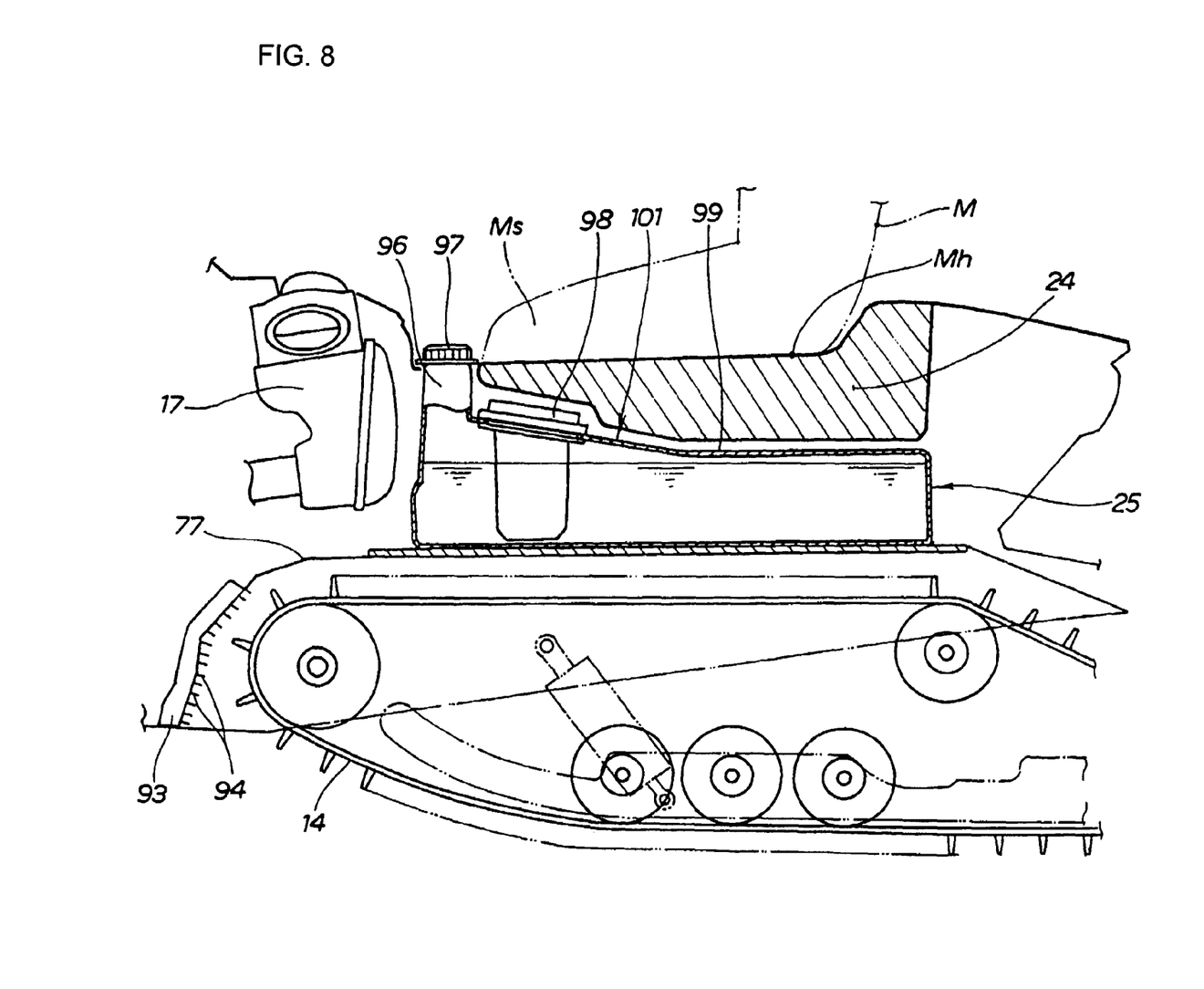
FIG. 8 is a sectional view of a fuel tank according to the present invention showing the fuel tank top surface at the front portion thereof raised upward relative to the top surface at a rear portion of the fuel tank, and showing the fuel pump provided in the raised top surface portion for feeding pressurized fuel to the engine.

FIG. 8 is a sectional view of the fuel tank according to the present invention, in which a radiator 93 is formed as one body with the rear frame 77. The radiator 93 is provided with heat-radiating fins 94 oriented so that the snow raked up by the track belt 14 will make contact with the heat-radiating fins 94. The radiator 93 may naturally be so shaped as to extend over the entire part of the lower surface of the rear frame 77, to provide a large heat-radiating area.

In addition, it is shown that the generally box-shaped fuel tank 25 is disposed on an upper surface of the rear frame 77, and the seat 24 is disposed on the upper side of the fuel tank 25. The seat 24 is formed to be thicker at the portion on which the hip point Mh of the rider M rests, and to be thinner at the portion which is clamped by both knees Ms of the rider M and on which no load is substantially exerted.

On the other hand, while the fuel tank 25 is fitted with the fuel tank supply pipe 96, a fuel tank supply cap 97 and the fuel pump 98, it is desirable to provide the fuel tank supply pipe 96 at a position as high as possible. Additionally, the fuel pump 98 is inserted into the fuel tank 25 from the upper side so that the fuel pump 98 can be inspected immediately upon opening the seat 24.

The engine according to the present invention is a fuel injection type engine, and, for this purpose, it is essential for the fuel pump 98 to be a high-pressure pump and be a large-sized pump. In order to contain the large-sized pump, it is necessary for the fuel tank 25 to have a predetermined height (depth).

In order to provide the predetermined height, a ceiling plate 99 of the fuel tank 25 is not level. Specifically, the portion of the ceiling plate 99 ranging from an intermediate position to a front portion of the fuel tank is slanted upwards toward the front of the fuel tank so as to provide a raised portion 101. As a result, the fuel tank supply pipe 96 can be mounted at a higher position of the fuel tank. Similarly, the fuel pump 98 is attached to the higher portion so that the height of the fuel pump 98 can be accommodated.

Correspondingly to this, the height of the fuel tank 25 at a rear half portion is set to be small so as to allow for the thickness of the seat 24, whereby the seating comfort is enhanced. As is clear from the figure, in the present invention, the overall height of both the seat 24 and the fuel tank 25 are harmonized, whereby it is possible to secure the required thickness of the seat 24 and the required height of the fuel tank 25, while maintaining a substantially constant overall height from the top surface of the seat 24 to the bottom surface of the fuel tank 25.

Figure 9:
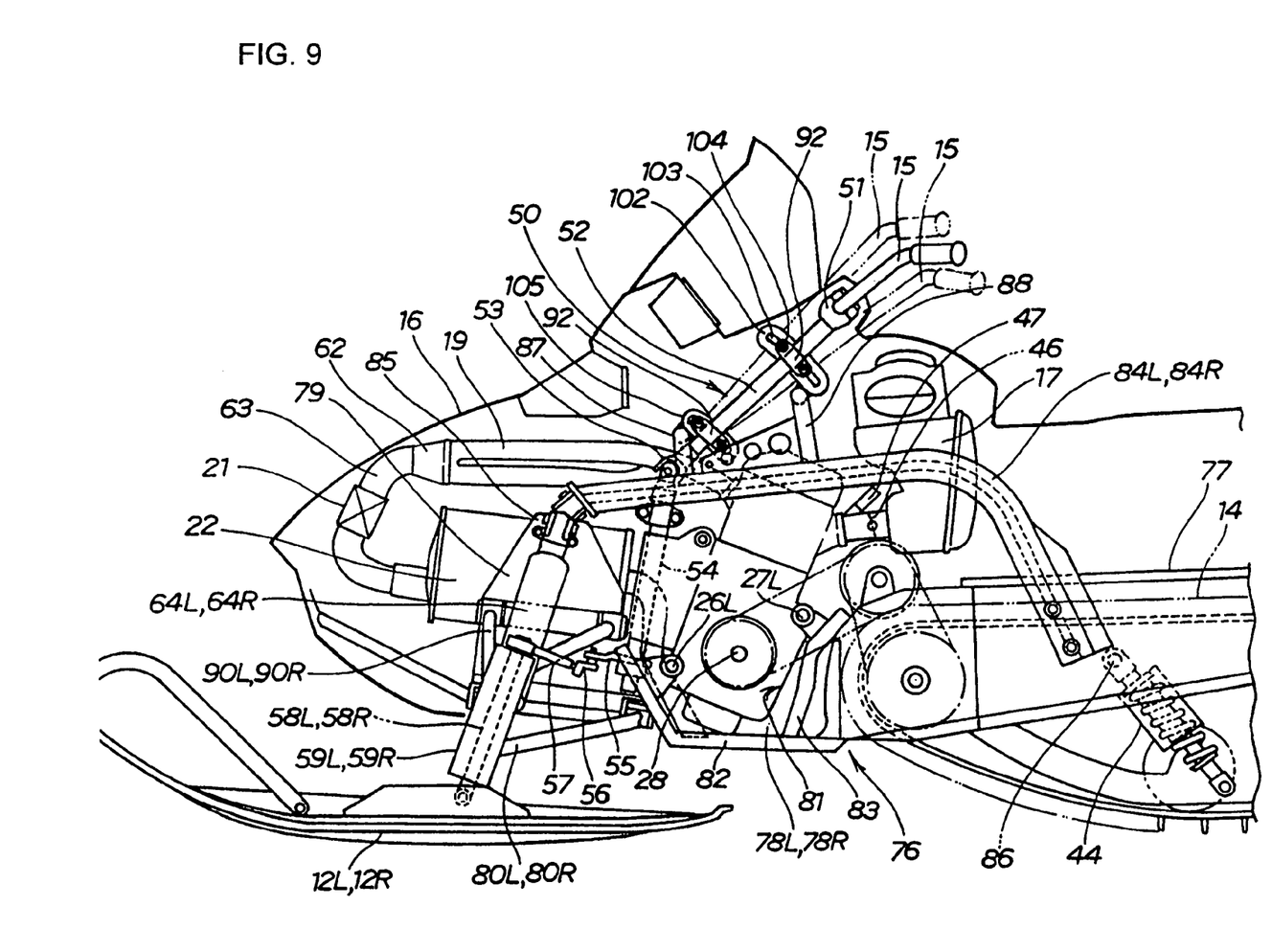
FIG. 9 is a view similar to FIG. 2 of another embodiment of a snowmobile according to the present invention, with a modification in the steering handle.

Now, another embodiment of the present invention will be described below, based on the drawings. FIG. 9 is a view similar to FIG. 2 showing another embodiment of the present invention with a modification in the steering handle, in which the same portions as in FIG. 2 are denoted by the same symbols as used above, detailed description thereof is omitted, and modified portions will be described principally.

An arcuate plate 102 is attached to the cross pipe 88, an arcuate hole 103 is bored in the arcuate plate 102, and the bearing block 92 is fastened to the arcuate hole 103 by a bolt 104. An arcuate plate 105 attached to the lower cross pipe 87 and the bearing block 92 are attached in the same manner. Incidentally, the arcuate plates 102 and 105 may be rectangular plates inasmuch as the arcuate hole 103 can be securely bored therein.

By the action of the arcuate hole 103, the steering handle 15 indicated by solid lines can be raised or lowered to the position indicated by imaginary lines, whereby the inclination angle of upper portion 52 of the steering shaft 50 can be selectively regulated. With the bolt 104 fixed in situ, the position of the steering handle 15 is determined. Namely, the height and angle of the steering handle 15 can be changed in conformity with the rider's physique or preference, whereby the convenience in use of the snowmobile is enhanced accordingly.

Figure 10:
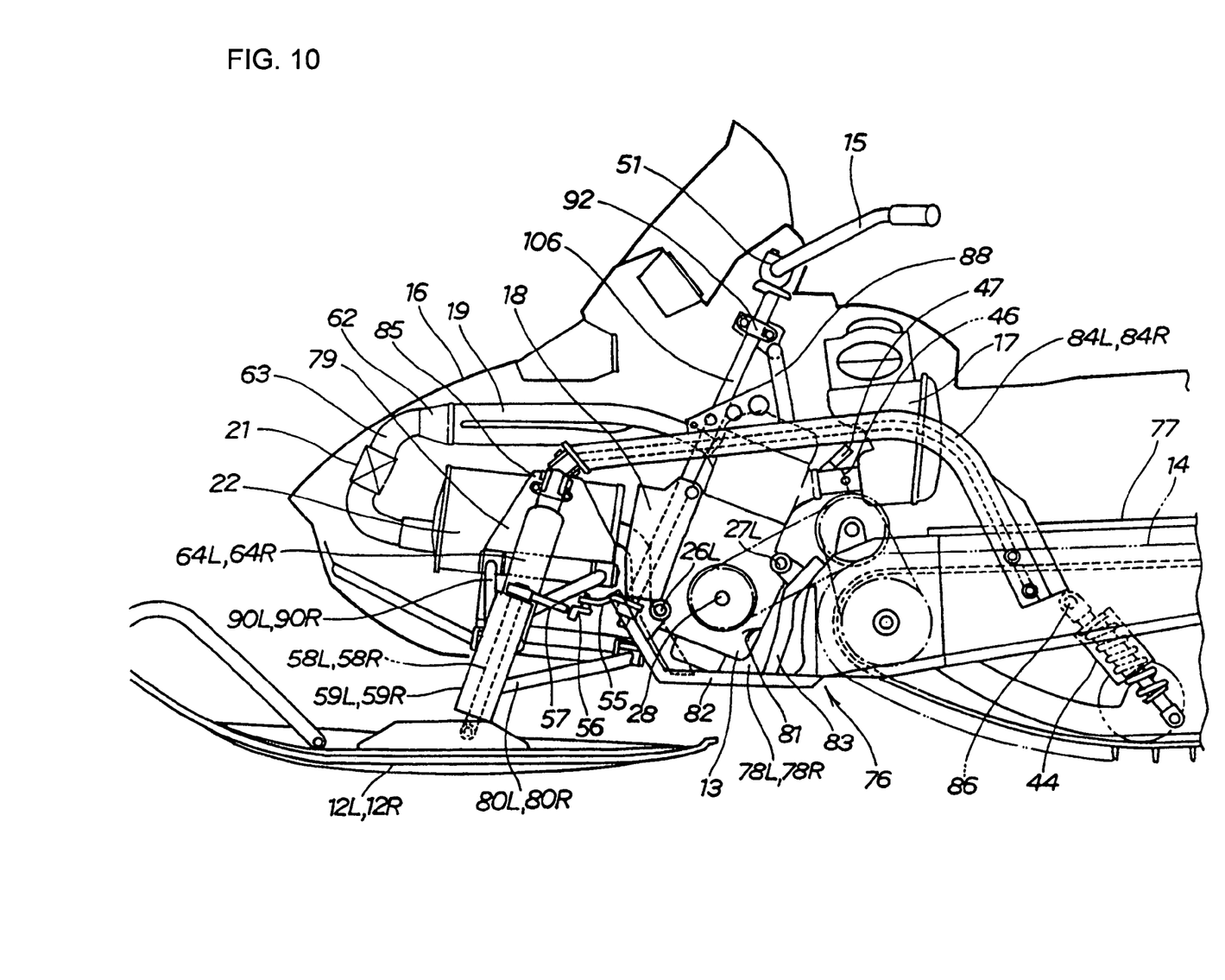
FIG. 10 is a view similar to FIG. 2 of still another embodiment of a snowmobile according to the present invention, with a different modification in the steering handle.

FIG. 10 is a is a view similar to FIG. 2 showing another embodiment of the present invention with a different modification in the steering handle, in which the same portions as in FIG. 2 are denoted by the same symbols as used above, detailed description thereof is omitted, and modified portions will be described principally.

In FIG. 10, it is shown that, by adopting a steering shaft 106 which passes through the oil tank 18, the universal joint 53 shown in FIG. 2 can be omitted. Specifically, the unitary, unsegmented steering shaft 106 passes on the front side of the engine 13 and on the rear side of the muffler 22, whereby it is possible reduce the number of component parts of the steering system.

Figure 11:
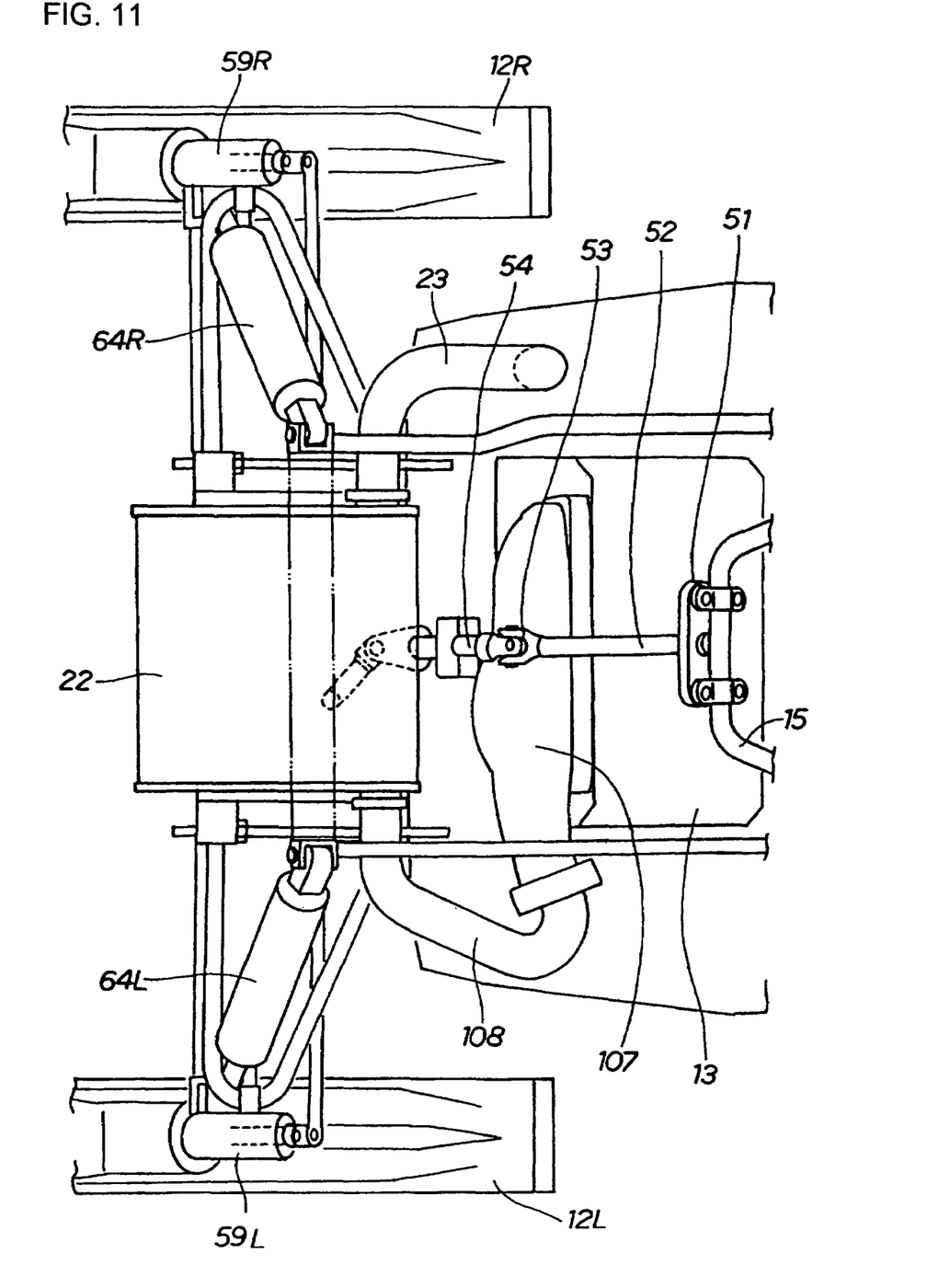
FIG. 11 is a plan view of a central portion of the snowmobile, showing a modification in the layout of the muffler.

FIG. 11 is a plan view of the mid portion of the snowmobile 10, showing a modification in the layout of the muffler, in which the muffler 22 is so laid out that its longitudinal axis extends in the vehicle width direction. A curved exhaust pipe 108 extends from the left end (as viewed from the rider) of an exhaust manifold 107 annexed to the engine 13. The curved exhaust pipe 108 is connected to the left side surface of the muffler 22, and the tail pipe 23 is extended from the right side surface of the muffler 22. The other component elements are denoted by the same symbols as used in FIG. 3, and detailed description thereof is omitted.

Figure 12:
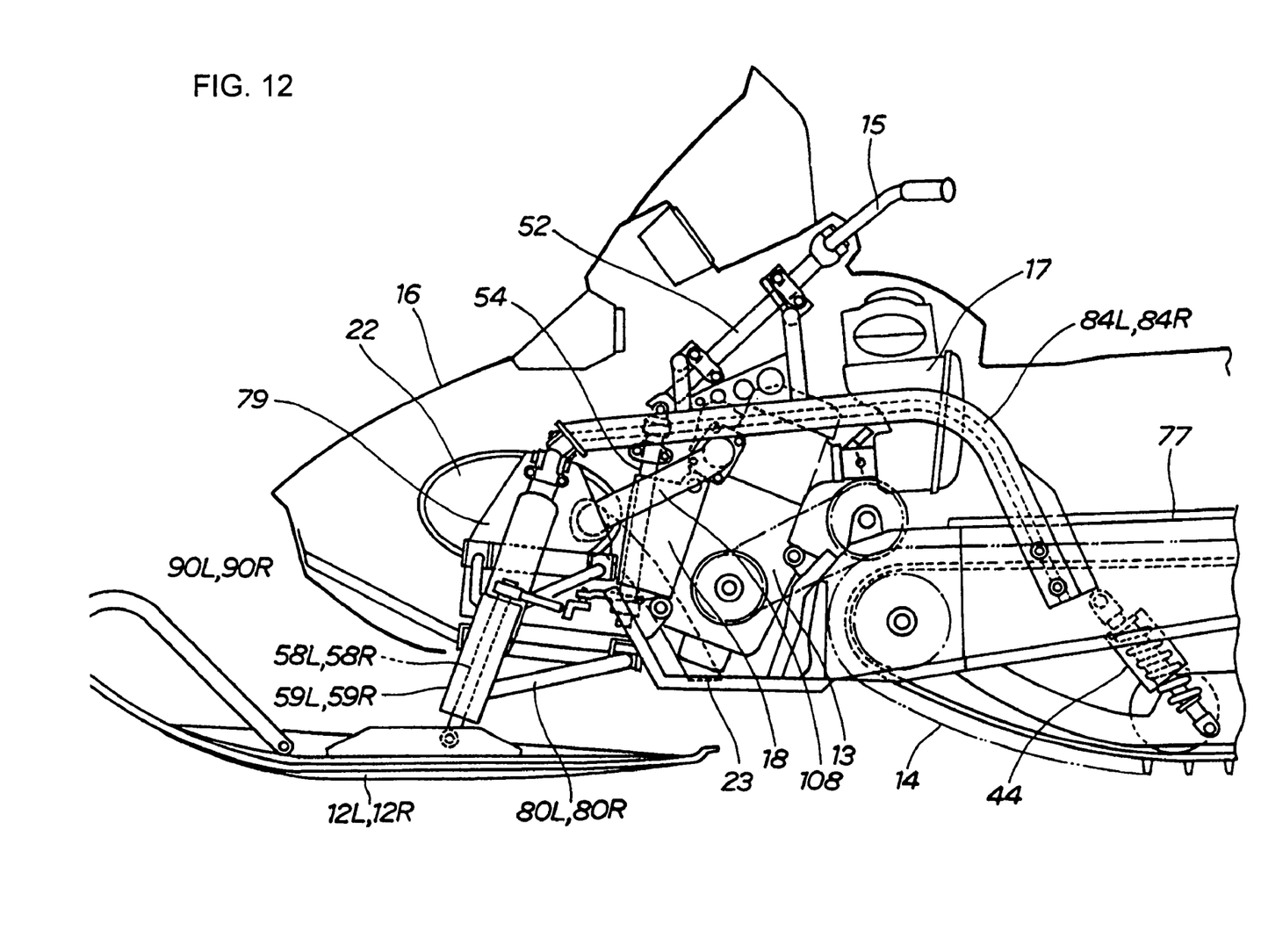
FIG. 12 is a figure corresponding to a side view of FIG. 11.

FIG. 12 is a figure corresponding to a side view of FIG. 11, and shows that the muffler 22 is extended in the depth direction of the drawing. The curved exhaust pipe 108 is compact, and, returning to FIG. 11, the curved exhaust pipe 108 and the tail pipe 23 can be laid out substantially symmetrically on the left and right sides of the muffler 22, so that the left-right weight balance property is easily enhanced. In addition, since the exhaust pipes are not present on the upper side of the muffler 22, it is possible to reduce the height of the front portion of the vehicle body. The other component elements are denoted by the same symbols as used in FIG. 2, and detailed description thereof is omitted.

The present invention is preferable for application to snowmobiles designed to travel on a snow surface or a snow field.

While a working example of the present invention has been described above, the present invention is not limited to the working example described above, but various design alterations may be carried out without departing from the spirit or scope of the present invention as set forth in the claims.

What is claimed is:

1. A snowmobile, the snowmobile comprising:
    a vehicle body having a front end which is a leading end in a forward driving direction of the vehicle, and a rear end opposed to the front end,
    a left-right pair of skis,
    a steering handle,
    a steering shaft for transmitting a steering force from said steering handle to said skis,
    an engine,
    an exhaust system for said engine including a muffler, and
    a track belt all provided on the vehicle body, wherein
    said track belt being driven by power of said engine to thereby cause said snowmobile to travel,
    said skis being steered by operation of the steering handle,
    said muffler being disposed on the front side of said engine,
    the steering shaft extending between said muffler and said engine, said engine includes a plurality of cylinders,
    said exhaust system includes a plurality of exhaust pipes, including first and second exhaust pipes, and an exhaust pipe manifold portion for joining together the plurality of exhaust pipes, and said steering shaft extends between said first and second exhaust pipes at a location adjacent to the exhaust pipe manifold portion.

2. The snowmobile as set forth in claim 1, wherein the steering shaft comprises a steering shaft upper portion, a steering shaft lower portion, and a universal joint interposed between the steering shaft upper portion and the steering shaft lower portion, and wherein the steering shaft lower portion is disposed close to said engine.

3. The snowmobile as set forth in claim 2, wherein an angle of inclination of steering shaft upper portion is adjustable.

4. A snowmobile, the snowmobile comprising:
a vehicle body having a front end which is a leading end in a forward driving direction of the vehicle, and a rear end opposed to the front end,
a steering handle,
a left-right pair of skis, said skis being steered by operation of the steering handle,
left and right front suspensions for suspending said left and right skis,
an engine including an exhaust system, and
a track belt driven by power of said engine to thereby cause said snowmobile to travel, wherein
the exhaust system includes a muffler and exhaust pipes connected to said muffler, the muffler being disposed forwardly of said engine and between said left and right front suspensions, a connection portion of said muffler for connection with each of exhaust pipes is provided on one of a front side and a rear side of said muffler, and an exhaust pipe manifold portion, wherein
said exhaust pipes and the exhaust pipe manifold portion extend on an upper side of said muffler, and
a downstream-side pipe on a downstream side of said exhaust pipe manifold portion is bent back in a U shape and connects the exhaust pipe manifold portion to a front portion of said muffler.

5. The snowmobile as set forth in claim 4, wherein said muffler is generally flat and has a height which is small relative to a width thereof.

6. A snowmobile, the snowmobile comprising:
a vehicle body having a front end which is a leading end in a forward driving direction of the vehicle, and a rear end opposed to the front end,
a steering handle,
a left-right pair of skis, said skis being steered by operation of the steering handle,
left and right front suspensions for suspending said left and right skis,
an engine, and
a track belt driven by power of said engine to thereby cause said snowmobile to travel,
all provided on the vehicle body, wherein
said engine comprises an exhaust system including a muffler and exhaust pipes, and further wherein
the muffler is disposed forwardly of said engine and between the left and right front suspensions, and
the muffler comprises a connection portion for connecting each of the exhaust pipes to the muffler, wherein an inlet portion of said muffler is located in the front portion of said muffler.

7. The snowmobile as set forth in claim 6, wherein said muffler is generally flat and has a height which is small relative to a width thereof.

8. The snowmobile as set forth in claim 6, wherein the snowmobile further comprises
a steering shaft for transmitting a steering force from said steering handle to said skis, the steering shaft comprising an upper portion and a lower portion, the upper portion being selectively angularly adjustable relative to the lower portion.

9. The snowmobile as set forth in claim 6, wherein the snowmobile further comprises
a steering shaft for transmitting a steering force from said steering handle to said skis, the steering shaft, and wherein the steering shaft extends between said muffler and said engine.

10. The snowmobile as set forth in claim 1, wherein
the muffler has a first longitudinal axis,
the vehicle body has a second longitudinal axis coincident with a centerline in the width direction of the vehicle, and
the first longitudinal axis is parallel to the second longitudinal axis.

11. The snowmobile as set forth in claim 10, wherein the first longitudinal axis overlies the second longitudinal axis.

12. The snowmobile as set forth in claim 1, wherein the steering shaft is a single straight body.

13. The snowmobile as set forth in claim 4, wherein the snowmobile further comprises
a steering shaft for transmitting a steering force from said steering handle to said skis, the steering shaft comprising an upper portion and a lower portion,
the upper portion being selectively angularly adjustable relative to the lower portion, and
the lower portion extends between said muffler and said engine.

14. The snowmobile as set forth in claim 2, wherein the steering shaft upper portion is selectively adjustable so that a height and angle of the steering handle are selectively adjustable.

15. The snowmobile as set forth in claim 4, wherein
the muffler has a first longitudinal axis,
the vehicle body has a second longitudinal axis coincident with a centerline in the width direction of the vehicle, and
the first longitudinal axis is parallel to the second longitudinal axis.

16. The snowmobile as set forth in claim 6, wherein
the muffler has a first longitudinal axis,
the vehicle body has a second longitudinal axis coincident with a centerline in the width direction of the vehicle, and
the first longitudinal axis is orthogonal to the second longitudinal axis.

* * * * *